United States Patent
Green (10) Patent No.: US 7,778,247 B2
(45) Date of Patent: Aug. 17, 2010

(54) CROSS LAYER NETWORK OPTIMIZATION FOR OFDMA SYSTEMS USING MESSAGE PASSING ALGORITHM

(75) Inventor: Marilynn Green, Coppell, TX (US)

(73) Assignee: Nokia Siemens Networks Oy, Espoo (FI)

( * ) Notice: Subject to any disclaimer, the term of this patent is extended or adjusted under 35 U.S.C. 154(b) by 270 days.

(21) Appl. No.: 11/976,743

(22) Filed: Oct. 26, 2007

(65) Prior Publication Data

US 2009/0110089 A1 Apr. 30, 2009

(51) Int. Cl.
*H04J 1/06* (2006.01)
(52) U.S. Cl. .................. 370/389; 370/329; 370/208
(58) Field of Classification Search ........... 370/389, 370/329
See application file for complete search history.

(56) References Cited

U.S. PATENT DOCUMENTS

| 7,552,097 | B2* | 6/2009 | Richardson et al. ........... 706/15 |
| 2006/0234704 | A1 | 10/2006 | Lee et al. | |
| 2007/0248048 | A1 | 10/2007 | Zhu et al. | |
| 2008/0056184 | A1* | 3/2008 | Green ................. 370/329 |
| 2009/0080544 | A1 | 3/2009 | Yin | |

OTHER PUBLICATIONS

Guocong Song et al., Utility-Based Resource Allocation and Scheduling in OFDM-Based Wireless Broadband Networks, IEEE Communications Magazine, Dec. 2005, pp. 127-134.

Guocong Song et al., "Cross-Layer Optimization for OFDM Wireless Networks—Part I: Theoretical Framework", IEEE Transactions on Wireless Communications, vol. 4, No. 2, Mar. 2005, pp. 614-624.

Guocong Song et al., "Cross-Layer Optimization for OFDM Wireless Networks—Part II: Algorithm Development", IEEE Transactions on Wireless Communications, vol. 4, No. 2, Mar. 2005, pp. 625-634.

Zhimei Jiang et al., "Max-Utility Wireless Resource Management for Best-Effort Traffic", IEEE Transactions on Wireless Communications, vol. 4, No. 1, Jan. 2005, pp. 100-111.

Taesoo Kwon et al., "Design and Implementation of a Simulator Based on a Cross-Layer Protocol between MAC and PHY Layers in a WiBro Compatible IEEE 801.16e OFDMA System", IEEE Communications Magazine, Dec. 2005, pp. 136-146.

Andreas Czylwik, "Adaptive OFDM for wideband radio channels", IEEE 0-7803-3336-5/96, 1996.

Cem U. Saraydar et al., "Pricing and Power Control in a Multicell Wireless Data Network", IEEE Journal on Selected Areas in Communications, vol. 19, No. 10, Oct. 2001, pp. 1883-1892.

(Continued)

*Primary Examiner*—Dang T Ton
*Assistant Examiner*—Pamit Kaur
(74) *Attorney, Agent, or Firm*—Staas & Halsey LLP (57) ABSTRACT

A method determines channel state information of a channel of a wireless network. Each of the wireless devices is configured to operate over the wireless network. An allocation of available transmission resources is performed according to a utility-based cross-layer resource management framework that transforms a utility function into an equivalent bipartite graph to concurrently maximize throughput and fairness in the resource allocation.

13 Claims, 4 Drawing Sheets

OTHER PUBLICATIONS

Peijuan Liu et al., "Forward-Link CDMA Resource Allocation Based on Pricing", IEEE 0-7803-6596-8/00, 2000.

Chi Zhou et al., "Two-Cell Power Allocation for Downlink CDMA", IEEE Transactions on Wireless Communications, vol. 3, No. 6, Nov. 2004, pp. 2256-2266.

Lei Song et al., "Hierarchical SIR and Rate Control on the Forward Link for CDMA Data Users Under Delay and Error Constraints", IEEE Journal on Selected Areas in Communications, vol. 19, No. 10, Oct. 2001, pp. 1871-1882.

F. P. Kelly et al., "Rate control for communication networks: shadow prices, proportional fairness and stability", University of Cambridge, UK.

Jeffrey K. MacKie-Mason et al., "Pricing Congestible Network Resources", IEEE Journal on Selected Areas in Communications, vol. 13, No. 7, Sep. 1995, pp. 1141-1149.

Eitan Altman et al., "Competitive Routing in Networks With Polynomial Costs", IEEE Transactions on Automatic Control, vol. 47, No. 1, Jan. 2002, pp. 92-96.

Frank Kelly, "Charging and rate control for elastic traffic", University of Cambridge, UK.

Viral Shah et al., "Power Control for Wireless Data based on Utility and Pricing", IEEE 0-7803-4872-9/98, 1998, pp. 1427-1432.

David Goodman et al., "Power Control for Wireless Data", IEEE Personal Communications, Apr. 2000, pp. 48-54.

Marilynn P. Wylie-Green et al., "Utility-based Cross Layer Optimization for OFDMA systems using the $\beta$-min-sum belief propagation algorithm" IEEE Conference on Broadband Communications, Networks, and Systems, Sep. 10, 2007, pp. 459-468.

Jian Zhu et al., "An Adaptive Subchannel Allocation Algorithm for OFDM-based Wireless Home Networks", IEEE Consumer Communications and Networking Conference, Jan. 5, 2004, pp. 352-356.

Xiang Lou et al., "Channel Assignment for Maximum throughput in Multi-channel Access Point Networks", IEEE Wireless Communications and Networking Conference Mar. 11, 2007, pp. 395-400.

Marilynn P. Wylie-Green et al., "Cross Layer Design for OFDMA Systems Using the $\beta$-Min-Sum Belief Propagation Algorithm" IEEE Global Telecommunications Conference, Nov. 26, 2007, pp. 5335-5340.

International Search Report and Written Opinion mailed May 14, 2009 and issued in corresponding International Patent Application PCT/US2008/012158.

A. Khattab et al., "Opportunistic Scheduling of Delay Sensitive Traffice in OFDMA-based Wireless Networks," 2006; pp. 1-10.

S. Kittipiyakul et al., "Subcarrier Allocation in OFDMA Systems: Beyond Water Filling," 2004; Sections 1, 2, 3, 5 and Abstract.

G. Song et al., "Adaptive Subcarrier and Power Allocation in OFDM Based on Maximizing Utility," 2003; pp. 1-5.

G. Song et al., "Utility-Based Joint Physical-MAC Layer Optimization in OFDM," 2002; Sections 1, 6 and Abstract.

S. Kittipiyakul et al., "A Fresh Look at Optimal Subcarrier Allocation in OFDMA Systems, " 2004.

International Search Report and Written Opinion in related International Application No. PCT/IB2007/002514, mailed on Apr. 11, 2008.

International Preliminary Report on Patentability mailed May 6, 2010 and issued in corresponding International Patent Application PCT/US2008/012158.

* cited by examiner

FIG. 1

BIPARTITE GRAPHICAL CONSTRUCTION OF THE ASSIGNMENT PROBLEM. THE EDGE WEIGHTS ARE DEFINED IN THE KEY. EDGES HAVING ZERO WEIGHT ARE NOT SHOWN. HERE, $R = p\Delta f / M$.

NON-NEGATIVE, UNIFORMLY DISTRIBUTED RANDOM PERTURBATIONS ARE ADDED TO EACH OF THE EDGE WEIGHTS BASED ON THE RELATIVE DISTANCE BETWEEN UNIQUE EDGE WEIGHT VALUES.

FIG. 4

THIS IS AN ALTERNATE PERTURBATION SCHEME IN WHICH THE RANDOMLY PERTURBED EDGE WEIGHTS ARE TOO CLOSE IN VALUE TO PRESERVE THE RELATIVE ORDER THAT IS PRESENT IN THE ORIGINAL EDGE WEIGHT MATRIX. PERTURBED WEIGHTS THAT FALL WITHIN THE HIGHLIGHTED REGION MAY BECOME AMBIGUOUS WITHIN THE OPTIMIZATION ALGORITHM.

FIG. 5

CROSS LAYER NETWORK OPTIMIZATION FOR OFDMA SYSTEMS USING MESSAGE PASSING ALGORITHM

BACKGROUND OF THE INVENTION

The inventors have studied a cross-layer optimization aimed to provide a strategy for the optimal allocation of network resources (such as sub-carriers assignments and data rates) to a set of users in consideration of system-wide fairness and spectral efficiency.

A radio resource scheduler in a base station typically performs the allocation of subcarriers and data transmission rate to users connected to the base station for each time-slot or multiple time-slots (an epoch).

In a multi-user system, maximum spectral efficiency (bit/s/Hz) can be achieved by first measuring or estimating the instantaneous channel gain between each sub-carrier and each user, mapping each such value to an achievable data rate and then allocating each sub-carrier to the particular user for which the throughput (over that sub-carrier) will be maximized. When repeated for each sub-carrier in the transmission band, this simple approach maximizes the total throughput but fails to take into account the user-perceived notion of fairness, since those users who may systematically experience poor channel conditions (such as those who are close to the cell edge) will always receive fewer network resources (e.g., sub-carriers) than those who may generally experience more favorable channel conditions. On the other hand, complete fairness (whereby users are simply allocated an equal number of sub-carriers regardless of actual channel capacity) results in a loss of spectral efficiency for the entire network.

Cross-layer optimization is a tool that can be used to balance the competing interests of spectral efficiency and user-perceived fairness in the allocation of network resources. It is an optimization approach whereby the objective function of the optimization problem is a utility function.

In almost all wireless applications, a reliable data transmission rate, r, is the most important factor in determining the satisfaction of users. Therefore, a utility function of the data rates, $U(r)$, should be a non-decreasing function of its argument. In particular, in a traditional network optimization, where the objective is to maximize the aggregate throughput, the utility is a linear function of the data rate, such as, $U(r)=r$. A utility function is typically a convex nonlinear function of the data rate or other, measurable network resources. Therefore, the utility optimization framework can be regarded as a general extension of the traditional problem of network optimization.

The utility functions can serve as an optimization objective for the adaptive physical and MAC layer techniques. Consequently, they can be used to optimize radio resource allocation for different applications and to build a bridge amongst the physical, medium access control (MAC) layer, and higher layers. In practice, utility functions cannot always be obtained through theoretical derivations, but may be estimated from subjective surveys. For example, for best effort traffic, a well-accepted utility function that is derived based on survey material is $$U(r)=0.16+0.8 \ln(r-0.3) \quad (1)$$

where r is in units of k b/s.

In order to prevent assigning too many resources to a user that already has good channel conditions, the utility function is typically selected such that its slope decreases when data rate becomes large, in accordance with the characteristic behavior of (1). Consequently, the fairness is easily taken into account.

In the conventional case, for which $U(r)=r$ and the goal is to maximize the sum throughput for all users that are active at a given moment, the slope of the utility curve is a constant value of one for each user (i.e., $U'(r)=1$). Consequently, max-utility is achieved by assigning each sub-carrier to the user with the best channel quality, which may result in a long-term policy that unfairly allocates resources to users who typically have good channel quality and starve those users whose channel conditions are systematically less favorable (e.g., those user who are located at the cell's edge). However, the derivative of the utility function is what actually controls the threshold of comparison for the distribution of resources. Hence, a non-linear utility function whose slope decreases when the data rate becomes large may constitute a basis for a more equitable resource distribution policy.

The allocation and management of resources is critical for wireless networks in which a scarce collection of resources is shared by multiple users. In the current layered networking architecture, each layer is designed and operated independently. However, wireless channels suffer from time-varying multi-path fading conditions and the statistical channel characteristics of different users are different. The sub-optimality and inflexibility of this architecture result in inefficient resource use in wireless networks. Hence, there is a need for an integrated adaptive design across different layers.

Fairness and efficiency are two important issues in resource allocation for wireless networks. Traditionally, spectral efficiency is evaluated in terms of the aggregate throughput, which favors those users who are either close to the base station or who have good channel conditions. Consequently, users who are far away from the base station or who systematically have poor channel conditions may be given fewer resources. However, absolute fairness—which allocates the same quantity of system resources to all users—may lead to low spectral efficiency. Therefore, there is a tradeoff between the issues of fairness and efficiency when designing the strategies for wireless resource allocation.

These issues of efficient and fair resource allocation have been long studied in economics, where utility functions are used to quantify the benefit of using certain resources. Recently, utility theory has also been studied for its use in communication networks as a mechanism to evaluate the degree to which a network satisfies service requirements of users' applications. In fixed, wire-line networks, utility and pricing mechanisms have been used for flow control, congestion control and routing. In wireless networks, the pricing of uplink power control in code division multiple access (CDMA) has been investigated. Utility-based power allocation in CDMA downlinks for both voice and data applications have been proposed.

SUMMARY

The inventors propose a method to allocate wireless sub-carrier bandwidth. A bipartite graph having first and second disjoint node sets is defined. Users are assigned to the first set of nodes such that each node of the first set of nodes is assigned to only one user and is associated with only one transmission rate. Each sub-carrier is assigned to one and only one node of a second set of nodes. Using edges, each node of the first set of nodes is connected to every node of the second set of nodes. Each edge is weighted using a value produced from a subcarrier and rate—dependent utility function. Unique edge weightings are numerically ordered such that each unique edge weighting has at least one adjacent edge weighting and at least some of the unique edge weightings have a duplicate edge weighting that is not ordered. For duplicate edge weightings, a perturbation factor between adjacent unique edge weightings is identified. All duplicate weightings are perturbed by a random variable which is greater than zero and less than the perturbation factor. A message passing algorithm is used to allocate data rates and subcarriers to users.

The first set of nodes may be assigned to unique user/data rate allocation combinations. That is, wherein for every user, a node is assigned for each rate allocation of a plurality of potential rate allocations. The perturbation factors may be assigned by a process including (1) identifying a perturbation factor that lies at the midpoint of the duplicate weighting and the next largest duplicate weighting, for all of the duplicate weightings except the last duplicated weighting, and identifying a perturbation factor that is equal to the duplicate weighting, for the last duplicate weighting. Alternatively, at least one perturbation factor may be determined as one half a distance between a unique edge weighting and the next largest unique edge weighting.

In the method in which the first set of nodes is opposing and disjoint from the second set of nodes, and the message passing algorithm may include the following described operations. One operation (a) is passing messages from each node of the first set of nodes to every node of the second set of nodes, the messages respectively being the edge weights. Another operation (b) is passing messages from each node of the second set of nodes to every node of the first set of nodes, the messages respectively being the edge weights. In another operation (c), for one of the first set of nodes, it is assumed that each node is assigned to the opposing node that sent the largest message. In another operation (d), it is determined if every node is assigned to one and only one opposing node. If there is a node that is not assigned to one and only one opposing node (1) all the edge weights are modified by $W_{new}=W_{old}-W_{largest}$ (where $W_{new}$ is a modified edge weight, $W_{old}$ is a previous edge weight and $W_{largest}$ is the largest edge weight for all opposing nodes except for the node having the weight being modified), and operations a-d are repeated. $W_{old}$ may be an original edge weight before any edge weight modification.

The message passing algorithm may be a beta-min-sum belief algorithm. The sub-carriers may be subcarriers of an OFDMA wireless communication system. If the number of nodes of the first set of nodes is not equal to the number of nodes of the second set of nodes, the method may further include adding dummy nodes to the first or second set of nodes to achieve equality in the number of nodes in both sets. If the number of nodes of the first set of nodes does not equal the number of nodes of the second set of nodes, the method may further include connecting each dummy node to every opposing node using dummy edges, and assigning a zero edge weight to each dummy edge. The argument of the utility function may be a function of a long term average data rate for a user and a function of a modulation level currently being allocated to the user.

The bandwidth allocation utility function is represented by the following formula $$\max_{r[n]} \frac{\rho_w \Delta f}{M} \sum_{i=1}^{M} \sum_{k=1}^{K} \sum_{p=0}^{P-1} U_i'(\bar{r}_i[n-1]) D_p[n] \delta_{ikp}[n],$$

-continued $$\text{subject to} \begin{cases} P[k,n] \le P_{\max} & \forall\, k \\ r_i[n] \in F_\pi & \forall\, i \\ \lim_{n \to \infty} \bar{r}_i[n] \ge c_i & \forall\, i \end{cases}$$

where $\rho_w$ is a fixed factor, $\Delta f$ denotes a frequency spacing between adjacent sub-carriers, M is the number of users, $U'_i$ is the derivative of a utility function of user i which is a function of average past rates of the user $\bar{r}_i[n-1]$, $D_p[n]$ is a pth modulation level and $\delta_{ikp}[n]$ indicates an assignment of the $D_p[n]$ to user i over sub-carrier k during a current transmission frame n, P[k,n] is a transmission power used over the kth sub-carrier during an epoch, $P_{max}$ is a maximum power per subcarrier that cannot be exceeded, $r_i[n]$ denotes an instantaneous data rate assigned to the ith user over the current transmission interval, $F_\pi$ represents the set of feasible/potential data rates, $\bar{r}_i[n]$ is the long-term average data rate of the ith user and $c_i$ is a target data rate for the ith user.

The inventors also propose a method to determine channel state information of a channel of a wireless network by allocating transmission resources to a plurality of wireless devices based on the channel state information. Each of the wireless devices is configured to operate over the wireless network. The allocation is performed according to a utility-based cross-layer resource management framework that transforms a utility function into an equivalent bipartite graph to concurrently maximize throughput and fairness in resource allocation. The framework may provide cross-layer Medium Access Control (MAC) layer and physical (PHY) layer optimization. The transmission resources may include a plurality of sub-carriers. The channel may be compliant with an Orthogonal Frequency Division Multiple Access (OFDMA) scheme.

The inventors also propose an apparatus having a channel conditioner configured to determine channel state information of a channel of a wireless network and a scheduler configured to allocate transmission resources to a plurality of wireless devices based on state information of the channel state information. Each of the wireless devices is configured to operate over the wireless network. The allocation is performed according to a utility-based cross-layer resource management framework that transforms a utility function into an equivalent bipartite graph to concurrently maximize throughput and fairness in resource allocation. The framework may provide cross-layer Medium Access Control (MAC) layer and physical (PHY) layer optimization. The transmission resources may include a plurality of sub-carriers. The channel may be compliant with an Orthogonal Frequency Division Multiple Access (OFDMA) scheme. The apparatus may be a base station, and one of the wireless devices is a handset.

The inventors also propose a method in which a resource allocation over a wireless network is received. The received resource allocation is one of a plurality of resource allocations performed according to a utility-based cross-layer resource management framework that transforms a utility function into an equivalent bipartite graph to concurrently maximize throughput and fairness in allocating the resources. The resource allocation uses the channel state information corresponding to a channel of the wireless network.

The inventors also propose an apparatus having a processor configured to receive a resource allocation over a wireless network. The received resource allocation is one of a plurality of resource allocations performed according to a utility-based cross-layer resource management framework that transforms a utility function into an equivalent bipartite graph to concurrently maximize throughput and fairness in resource allocation. The resource allocation is based on the channel state information corresponding to a channel of the wireless network.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Figure 1:
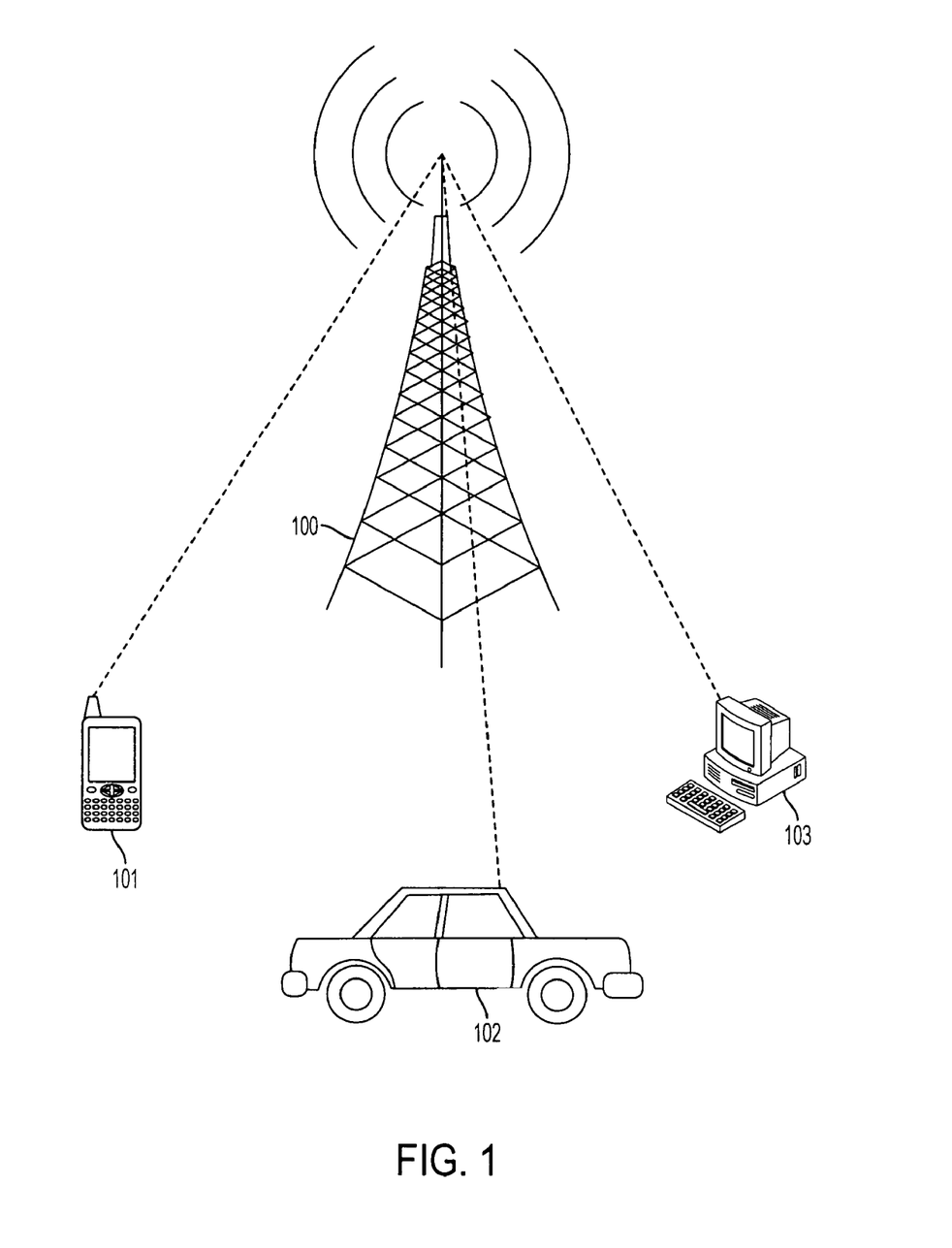
FIG. 1 illustrates a wireless communication system.

FIG. 1 illustrates a wireless communication system. A base station 100 may be in communication with a plurality of users, among which a mobile phone 101, a GPS system in a car, and a computer 103.

Cellular-based wireless transmission technologies employing orthogonal frequency division multiple access (OFDMA), allow multiple users to transmit in the same time slot and dynamically share the bandwidth and data transmission rate among them.

The methods and devices described here do not trade off the fairness and efficiency of the resource allocation, and also build a bridge between the physical and media access control (MAC) layers in order to achieve cross-layer optimization in an orthogonal frequency division multiple access (OFDMA) wireless network.

OFDMA divides the entire channel into many orthogonal narrowband sub-channels in order to combat frequency-selective multipath fading and to support high data rates. Furthermore, in OFDMA wireless networks, different sub-carriers can be allocated to different users in order to provide a more flexible multiuser access scheme and to more fully exploit multiuser diversity.

The flexibility of sub-carrier assignment in OFDMA provides for data rate adaptation over each sub-carrier and dynamic sub-carrier assignment in order to improve the performance of the system. Using data rate adaptation, the transmitter can send higher transmission rates to users over the sub-carriers that have better conditions. In addition, when the base station has knowledge of the different channel conditions and queue states of individual users, it can implement policies that dynamically assign users to sub-carriers in a manner that improves the long-term performance of the network.

A method of allocating bandwidth and data rates to user according to an embodiment uses a low complexity belief propagation algorithm that provides the optimal (or near-optimal) solution to the problem of resource allocation and scheduling for an OFDMA broadband wireless network. By incorporating the use of utility functions into the optimization framework, the cross-layer optimization solution is obtained in consideration of system-wide fairness and spectral efficiency. The method is a utility-based cross-layer resource management framework that exploits instantaneous channel state information at the base station in order to schedule traffic during each frame. During each decision epoch (over one or few time-slots), the method described here finds an efficient and fair rate and sub-carrier allocation policy that maximizes the average network utility subject to certain constraints.

Figure 2:
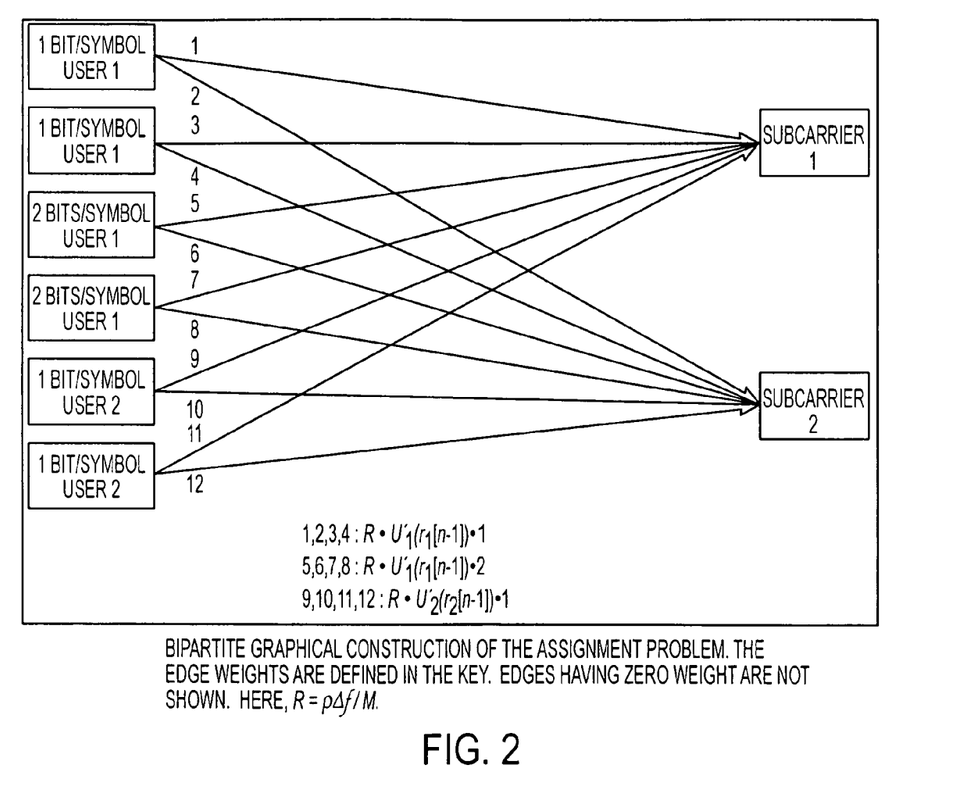
FIG. 2 is a bipartite graphical construction of the assignment problem.

The method uses an equivalent graph theoretical model for the cross-layer assignment problem, which is equivalent to the classical problem of finding the Maximum Weight Matching (MWM) on a bipartite graph as exemplarily illustrated in FIG. 2. A bipartite graph is a special graph in which the vertices can be divided into two disjoint subsets such that no edge has both points in the same set. One set (the left side of the graph) are the users with assigned data transmission rates. The other set (the right side of the graph) are available sub-carriers. The edges are different possible sub-carrier allocations to users. Each edge has an allocated weight. Edges having zero weight are used. If allocating a sub-carrier to a user is not a feasible alternative, the edge is not considered. The weight allocated to the edges incorporates the utility function in the graph used to find an optimal solution to the sub-carrier and rate allocation to users.

The method is a utility-based optimization using the long-term average data rate. To estimate the initial weights, the weighted average data throughput over several epochs, rather than an instantaneous optimization, is used. In a downlink scenario, for example, a base station transmits simultaneously to M users there are K available sub-carriers, and the base station can only transmit to a single user over each sub-carrier (although this restriction is easily relaxed). The long-term target data rates for these users are denoted as $\{c_1 \ldots c_M\}$ and the (known) maximum transmission power that may be used over any sub-carrier is given by $P_{max}$.

The method aims to assign each sub-carrier of the K available sub-carriers to a particular user of the M users, and to determine the appropriate number of bits per sub-carrier (modulation level) in order to maximize the following objective function $$\max_{r[n]} \frac{1}{M} \sum_{i=1}^{M} U_i(\bar{r}_i[n]), \text{ subject to} \begin{cases} P[k, n] \le P_{max} & \forall k \\ r_i[n] \in F_\pi & \forall i \\ \lim_{n \to \infty} \bar{r}_i[n] \ge c_i & \forall i \end{cases} \quad (2)$$

The utility function $U_i(\cdot)$ is assigned to the ith user based on his individualized long term target rate requirement, $P[k,n]$ is the transmission power used over the kth sub-carrier during the current epoch. There is a maximum power per subcarrier that cannot be exceeded. Thus, if the utility function shows an ideal data rate of 4 bits/symbol, for example, and the channel is very weak, this data rate will not be assigned if it requires too much power. The symbol $r_i[n]$ denotes the instantaneous data rate assigned to the ith user over the current transmission interval and $F_\pi$ represents the set of feasible/potential data rates. Thus, if the utility function shows an ideal data rate of 3.1416 bits/symbol, this data rate will not be assigned if it violates the constraints of the transmission method, perhaps OFDMA. The symbol $\bar{r}_i[n]$ is the long-term average data rate of the ith user, which should be greater than or equal to some target data rate for the ith user $c_i$. All three of the constraints shown above are used to determine potential data rates.

By exploiting an exponentially weighted low-pass time-window, it can be updated as follows:

$$\bar{r}_i[n] = (1-\rho_w)\bar{r}_i[n-1] + \rho_w r_i[n] \quad (3)$$

where $\rho_w > 0$ is a fixed (small) parameter.

Different utility functions may be used for different users, thereby ensuring a more flexible medium for network optimization which facilitates different quality of service (QoS) targets for different user classes. For example, consider the following family of utility functions:

$$U_i(r) = \begin{cases} a(1 - e^{-b_i r}) & r \geq 0 \\ -\infty & r < 0 \end{cases} \quad (4)$$

where a and $b_i$ are strictly positive real numbers. a represents the maximum of the utility function (which is common to all users) and $b_i$ is chosen so that at some target rate, $c_i$, the utility is equal to 0.9a. Given $c_i$, we define $b_i = -\ln(0.1)/c_i$. Thus, QoS management for different user classes and requirements may be incorporated into the optimization framework by assigning different target bit rates, $c_i$, to the utility functions of individual users.

In general, as expressed in (2), the cross layer optimization problem requires the maximization of a non-linear function of the long-term average rates of each user. The method employs a simple transformation which yields an alternate construction that is linear in the unknown rate assignment. Assuming small $\rho_w$, we expand the utility function in a first-order Taylor series about the long term average rate:

$$U_i(\bar{r}_i[n]) \approx U_i(\bar{r}_i[n-1]) + U_i'(\bar{r}_i[n-1]) \cdot (\bar{r}_i[n] - \bar{r}_i[n-1]) \quad (5)$$

Substituting (3) into (5), the following expression is obtained $$U_i(\bar{r}_i[n]) \approx U_i(\bar{r}_i[n-1]) + \rho_w U_i'(\bar{r}_i[n-1]) \cdot (r_i[n] - \bar{r}_i[n-1]) \quad (6)$$

Direct substitution of (6) into (2) and ignoring those terms that are dependent on past decisions (and which are therefore constant with respect to the current decision epoch), the following expression is obtained $$\max_{r[n]} \frac{1}{M} \sum_{i=1}^{M} \rho_w U_i'(\bar{r}_i[n-1]) r_i[n], \text{ subject to } \begin{cases} P[k,n] \leq P_{max} & \forall k \\ r_i[n] \in F_\pi & \forall i \\ \lim_{n \to \infty} \bar{r}_i[n] \geq c_i & \forall i \end{cases} \quad (7)$$

which is linear in the instantaneous user rates. The dependence of the objective function on the derivative of the utility function serves to further emphasize that the slope of this function (which depends on the past decisions) helps to determine the threshold for the fair and efficient allocation of resources.

Non-linear combinatorial optimization methods can be used in order to solve (7). The method takes a different approach by reformulating the utility-based rate optimization problem as a Maximum Weight Matching problem on a bipartite graph. This alternate problem construction is also conducive to the use of a modified belief propagation algorithm to find a nearly optimal policy.

The objective function in (7) is functionally dependent on the total instantaneous data rate, $r_i[n]$. In order to determine the optimal number of bits per sub-carrier, it is advantageous to express $r_i[n]$ as $$r_i[n] = \sum_{k=1}^{K} r_{ik}[n]\Delta f \quad (8)$$

where $r_{ik}[n]$ (bits/s/Hz) denotes the current rate assignment to the ith user over sub-carrier k and $\Delta f$ denotes the frequency spacing between adjacent sub-carriers.

Assuming discrete, adaptive modulation, $r_{ik}[n]$ takes values over some finite set, D, of cardinality P. Consequently, the selected data rate can be written as the weighted sum of all of the potential modulation levels $$r_{ik}[n] = \sum_{p=0}^{P-1} D_p[n] \delta_{ikp}[n] \quad (9)$$

Here, $D_p[n]$ is the pth modulation level and $\delta_{ikp}[n]$ indicates the assignment of the $D_p[n]$ to user i over sub-carrier k during the current transmission frame. For a given user/sub-carrier combination, the power constraint ensures that that the feasible members of D are those for which the required transmit power level do not exceed the maximum value that can be used over any sub-carrier $P_{max}$. By replacing $r_i[n]$ in equation (7) according to equations (8) and (9) the expression for the optimization becomes $$\max_{r[n]} \frac{\rho_w \Delta f}{M} \sum_{i=1}^{M} \sum_{k=1}^{K} \sum_{p=0}^{P-1} U_i'(\bar{r}_i[n-1]) D_p[n] \delta_{ikp}[n], \quad (10)$$

$$\text{subject to } \begin{cases} P[k,n] \leq P_{max} & \forall k \\ r_i[n] \in F_\pi & \forall i \\ \lim_{n \to \infty} \bar{r}_i[n] \geq c_i & \forall i \end{cases}$$

For a given user/sub-carrier combination, the power constraint ensures that that the feasible members of D are those for which the required transmit power level do not exceed the maximum value that can be used over any sub-carrier: $P_{max}$.

The feasible combinations of modulation levels and sub-carrier allocations are represented by two sets of nodes on a bipartite graph (e.g. see FIG. 2) with edge weights assigned according to the utility-based weights in (10). Then, the resulting optimization problem can be treated as a Maximum Weight Matching on a bi-partite graph.

In the bi-partite graph, each sub-carrier is represented by a single node. Thus, there are K sub-carrier nodes in the graph.

To construct the user nodes for each user are created a set of nodes which correspond to the each of the modulation levels in D. Each modulation level node is replicated as many times as the number of sub-carriers that can support that rate at the required symbol error rate (SER). In addition, for a particular user and modulation level combination, an edge in the graph only exists to a particular sub-carrier node if transmission at that rate and over that sub-carrier can meet the required SER without violating the maximum per-sub-carrier power allowance, $P_{max}$. Hence, depending on the required power, some modulation levels may not be considered for a particular user/sub-carrier combination, which implies fewer user nodes due to the power constraint.

More formally, the bipartite graph is $G_{n,m} = (X, Y, E)$ where X denotes a set of n nodes and Y denotes a set of m nodes and, in general, n≠m. These are, respectively, labeled as $\{X_1, X_2, \ldots, X_n\}$ and $\{Y_1, Y_2, \ldots Y_m\}$. All edges in the graph are labeled as $(x,y) \in E$, where $x \in x$ and $y \in Y$. A subset of the edges, $M \subseteq E$, is said to be a matching if no two edges in M are incident to the same node. Weight is a measure of user's satisfaction.

For a particular matching, M, and for each edge $(X_i, Y_j)$, let $\alpha_{ij}$ be an indicator which is equal to one if $(X_i, Y_j)$ is in the matching and zero otherwise. Let A be the permutation matrix which corresponds to perfect (i.e., full) matches, then the permutation that achieves the Maximum Weighted Matching can be defined as $$A^* = \underset{A \in P}{\operatorname{argmax}} \sum_{0 \leq i,j \leq \max(m,n)} w_{ij} \alpha_{ij}. \quad (11)$$

where P denotes the set of permutation matrices.

Since optimality is guaranteed for complete graphs (i.e., for n=m), and the cross-layer problem generates rectangular edge weight matrices (i.e., n≠m), the bipartite graph may be completed with max(n—m, m−n) edges of zero weight in order to construct a complete graph. The extra nodes are added to whichever set (either user nodes or sub-carrier nodes) that are fewer in number. Hence, in what follows, we simply assume the appropriate number of extra nodes have been added and that n=m.

FIG. 2 is a simple example of a bipartite graph, for the case in which there are two users (User 1 and User 2), two sub-carriers (K=2) and two available modulation levels D={1, 2} bits/sub-carrier (the option 0 bits/sub-carrier is also included, by assumption). The instantaneous channel conditions for User 1 allow the transmission of up to 2 bits over both sub-carriers without violating the maximum power constraint. Hence, there are edges between all of the modulation-level nodes of User 1 to both representative sub-carrier nodes. The base station can transmit to User 2 at a transmission rate of up to 2 bits over Sub-carrier 1. However, due to poor channel conditions and the maximum power constraint, the base station can only send 1 bit in its transmission to User 2 over Sub-carrier 2. This is illustrated in the graph by the absence of modulation level 2 bits/sub-carrier for User 2.

A redundancy in the edge weights is inherent, as multiple nodes corresponding to the same user and encoding rate also share the same edge weight. However, replication of the nodes is necessary, as the Maximum Weight Matching assigns each node to one and only one node of the other type. Hence, in order to allow all possible combinations (including the same modulation level being assigned to multiple sub-carriers for one particular user), the graph is constructed, as shown in FIG. 2, with replicated nodes.

The optimal solution of the cross-layer optimization problem can be solved using any of the well-known algorithms which solve the assignment problem, such as the Hungarian algorithm, which optimally assign n users to n tasks. However, obtaining the optimal solution is burdensome due to the complexity and the computation time. Therefore, the optimal solution that is obtained using the Hungarian algorithm is only an upper bound for the performance. A simpler iterative message-passing algorithm may be used as a lower complexity, sub-optimal alternative.

The iterative message-passing algorithm according to an embodiment used to find a sub-optimal solution to the problem of sub-carrier and rate assignment in an OFDMA network, is a belief propagation (BP) which solves graphical inference problems via a series of local message-passing operations. Traditionally used to solve problems of "inference", BP is actually the underlying basis for certain apparently different methods, such as the forward-backward algorithm, the Viterbi algorithm, iterative decoding for Gallager codes and turbo codes, the Kalman filter and Pearl's belief propagation algorithm for Bayesian networks.

Max-product (MP) is a local, iterative message passing style BP algorithm that is used to find the maximum a posteriori (MAP) assignment of a discrete probability distribution that has been specified by a graphical model.

The problem of finding a Maximum Weight Matching on a bipartite graph transforms to an equivalent one of finding a MAP assignment in a related graphical model by associating the random variables $X_1, \ldots, X_n, Y_1, \ldots, Y_n$ with the vertices of a graph $G_{n,n}$. Consider the function $f(A): \Re \to \Re$ and the following definition $$f(A) = \prod_{i,j=1}^{n} f_{ij}(\alpha_{ij}) \prod_{k=1}^{n} \chi_{X_k}(\{\alpha_{kj}\}_{j=1}^{n}) \prod_{i=1}^{n} \chi_{Y_i}(\{\alpha_{ij}\}_{i=1}^{n}) \quad (12)$$

where the pairwise compatibility functions and node potentials are, respectively, of the form $$\chi_{X_k}(\cdot) = \begin{cases} 1 & \text{if exactly one of the } \{\alpha_{kj}\}_{j=1}^{n} \text{ variables is 1} \\ 0 & \text{else} \end{cases} \quad (13)$$

$$\chi_{Y_i}(\cdot) = \begin{cases} 1 & \text{if exactly one of the } \{\alpha_{ij}\}_{i=1}^{n} \text{ variables is 1} \\ 0 & \text{else} \end{cases}$$

$$f_{ij}(\alpha_{ij}) = \exp(w_{ij} \alpha_{ij})$$

As max and log functions are interchangeable, the Maximum Weight Matching of $f(A)$ is equal to $A^*$. Hence, $$A^* = \underset{A \in P}{\operatorname{argmax}} \sum_{0 \leq i,j \leq \max(m,n)} w_{ij} \alpha_{ij} = \underset{A \in P}{\operatorname{argmax}} f(A). \quad (14)$$

The simplified min-sum algorithm has been identified as a method to solve the problem of Maximum Weight Matching on random bipartite graphs. Motivated by the low complexity and distributive nature of this solution, we also consider its application to the cross-layer optimization problem. However, optimality of simplified min-sum algorithm is only guaranteed when there is a unique maximum (in particular, the algorithm will not work if matrix of edge weights is rank-deficient). In order to achieve a square matrix, the number of users-potential data rates must equal the number of sub-carriers. If there is inequality, then dummy entries each having edge weight values of zero are added to the matrix or the bipartite graph.

In our application, the optimal solution is not necessarily unique due to the redundancy of the edge weights, which forces the edge weight matrix to be singular. However, one possible way to solve this problem is to nominally perturb the edge weights before applying the simplified min-sum algorithm so that the resulting graph is random but the relatively ranked edge weights between different user's nodes remains undisturbed.

Figure 3:
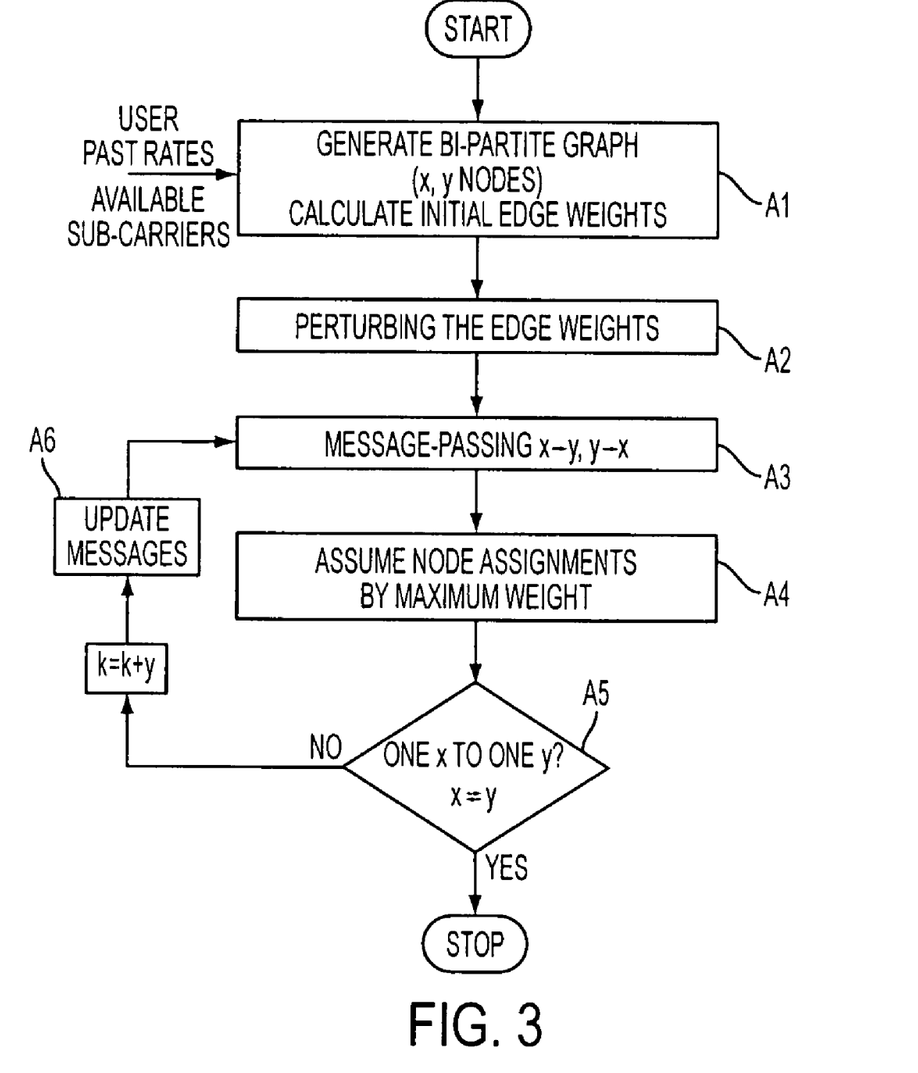
FIG. 3 is chart of the β-min-sum algorithm for finding a sub-optimal solution of the sub-carrier and rate assignment in an OFDMA network.

Following is the proposed β-min-sum algorithm (see FIG. 3), which is a non-trivial modification to the β-min-sum algorithm presented in. FIG. 3 is chart of the β-min-sum algorithm for finding a sub-optimal solution of the sub-carrier and rate assignment in an OFDMA network according to an embodiment. The β-min-sum algorithm is just one example of a message passing algorithm.

First the bi-partite graph $G_{n,n}$ is generated as described above in operation A1 using rate and sub-carrier assignment historic data and user-specific utility functions. FIG. 2. assumes that there are two potential data rates (1 bit/symbol and 2 bits/symbol), two users, and two sub-carriers. Each user is connected to each sub-carrier for each potential data rate. Thus, User 1 is connected to sub-carrier 1 at a data rate of 1 bit/symbol and at a data rate of 2 bits/symbol. User 2 does not have a potential data rate of 2 bits per symbol, perhaps because User 2 is a distant user and a transmission rate of 2 bits per symbol would exceed the maximum allowable power. If the number of users/potential data rates does not equal the number of sub-carriers, then dummy nodes are added, each with a value of zero.

In FIG. 2, each user-potential data rate is connected to each sub-carrier with an edge. The edge is weighted with an edge weight may be determined from a linearized utility function. For example, the utility function of Equation (4) may be linearized using equation (10). It should be apparent that the utility function may depend on the data rate given to the user in the past and the instantaneous data rate currently being allocated to the user. In FIG. 2, it is apparent that there is a plurality of edges associated with the instantaneous data rate of 1 bit/symbol. This instantaneous data rate is shown for both User 1 and User 2. User 1 and User 2 are independent. It is unlikely that they will have the exact same historical usage pattern. Thus, User 1 and User 2 will most likely have different historical data rates, which will create different edge weights for User 1 and User 2. However, for User 1, for example, the 1 bit/symbol connection to sub-carrier 1 will have the same weight as the 1 bit/symbol connection to sub-carrier 2. Edges 1-4 will have the same weight. This redundancy prohibits a bipartite graph or message passing algorithm solution. This redundancy must be eliminated.

Continuing with the example of edges 1-4, these four duplicate edges have only one unique edge weight. The N unique edge weights of the graph are $\{\tilde{w}_{(1)}, \tilde{w}_{(2)}, \ldots, \tilde{w}_{(N)}\}$ and one can consider $\tilde{w}_{(1)} < \ldots < \tilde{w}_{(N)}$ without loss of generality. The bipartite graph is uniquely determined by the data traffic demands at a certain moment.

At A2, an edge weight $w_{ij}$ corresponding to $(X_i, Y_j) \in E$ assuming that $w_{ij} = \tilde{w}_{(k)}$ edge weight is perturbed as follows: $w_{ij}' = w_{ij} + \beta_{ij}$, where $\beta_{ij} \sim U(0, \delta_k)$ and $\delta_k = (\tilde{w}_{(K+1)} - \tilde{w}_{(k)})/2$ for $k=1, \ldots, N-1$, and let $$\delta_N = \frac{1}{N-1} \sum_{k=1}^{N-1} \delta_k \text{ for } k = N.$$

At A3, messages are passed between neighbor nodes. At the first iteration the messages are $m_{X_i \rightarrow Y_j}^0 = w_{ij}'$; $m_{Y_j \rightarrow X_i}^0 = w_{ij}'$. If $m_{X_i \rightarrow Y_j}^k \in \Re$ is the message passed from node $X_i$ to $Y_j$ during the kth iteration (k>1), the messages are $$m_{X_i \rightarrow Y_j}^k = w_{ij}' - \max_{l \neq j} m_{Y_l \rightarrow X_i}^{k-1}, \quad (15)$$

$$m_{Y_j \rightarrow X_i}^k = w_{ij}' - \max_{l \neq i} m_{X_l \rightarrow Y_j}^{k-1},$$

For k>1, the messages are updated as follows $$m_{X_i \rightarrow Y_j}^k = w_{ij}' - \max_{l \neq j} m_{Y_l \rightarrow X_i}^{k-1}, \quad (16)$$

$$m_{Y_j \rightarrow X_i}^k = w_{ij}' - \max_{l \neq i} m_{X_i \rightarrow Y_l}^{k-1},$$

That is, messages equivalent to the edge weight are passed from each node of the first set of nodes to every node of the second set of nodes. Then, messages equivalent to the edge weight are passed from each node of the second set of nodes to every node of the first set of nodes. Every node of the first or second sets of nodes looks at all messages received and determines who sent the largest message.

The Maximum Weight Matching estimated after iteration k at A4 is $\pi^k$, where $$\pi^k(i) = \underset{j \in N(i)}{\operatorname{argmax}} \{m_{Y_j \rightarrow X_i}'\} \text{ for } i = 1, \ldots, n.$$

That is, the node then assumes that it is assigned to the opposing node that sent the largest message.

Operations A3 and A4 are performed until the algorithm converges at A5. The convergence test is whether every node is assigned to one and only one opposing node. If not, new messages at A6 are derived and passed again.

The variable $\delta_N$ may be simplified to $\delta_N = w_{(N)}/2$. In effect, this definition is commensurate with adding a last unique edge weight $w_{(N+1)} = 2w_{(N)}$. This is obvious by noting the definition of $\delta_k$ (for $k=1, \ldots, N-1$) and that $w_{(1)} = 0$ due to the inclusion of edges of weight zero.

Figure 4:
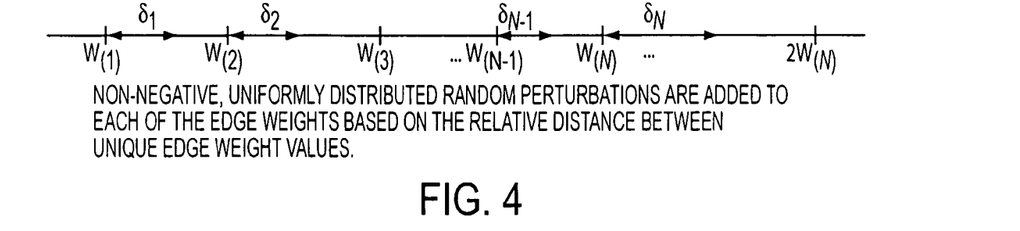
FIG. 4 illustrates that non-negative, uniformly distributed random perturbations are added to each edge weights based on the relative distance between unique edge weight values.

The perturbed edge weight matrix is random, which guarantees its convergence. However, it is important to note that the relative ordering of the edge weights that have different values in the original edge weight matrix is undisturbed by this random perturbation method, as illustrated in FIG. 4, where an edge weight that has value $w_{(i)}$ in the original edge weight matrix is illustrated as having a value $w_{(i)}' < w_{(i+1)}$ after the perturbation.

Figure 5:
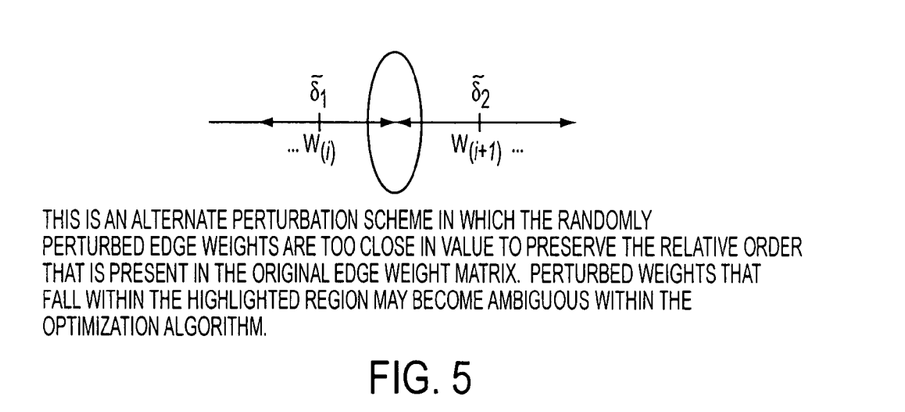
FIG. 5 illustrates an alternative perturbation scheme in which the randomly perturbed edge weights are too close to preserve the relative order of the perturbed edge weights.

Non-negative perturbations that are upper bounded by the distance between consecutive order statistics, $w_{(i)}$ and $w_{(i+1)}$ are used. By doing so, it is avoided to have perturbed edge weights associated with different order statistics too close for the algorithm to preserve their original rankings, as simply illustrated in FIG. 5 for the case in which the perturbation is allowed to have both positive and negative values.

The above-described modified β-min-sum algorithm has the following features.

With probability one, the β-min-sum algorithm converges to a matching with a weight that is upper-bounded as $$A' \leq A^* + n \cdot \max_k (\delta_k). \quad (17)$$

where A' denotes the weight of the matching from the perturbed edge weight matrix and A' is the weight of the optimal matching which might be obtained using (for example) the Hungarian algorithm and the original edge weight matrix. To prove this feature let $$\sum_{i=1}^{n} w'_{i\pi(i)}$$

denote the matching obtained using the β-min-sum algorithm on the perturbed matrix, W', and $$\sum_{i=1}^{n} w_{i\pi(i)}$$

be the sum of (not necessarily optimal) matched edge weights in the original, unperturbed edge weight matrix, W.

Taking into consideration that there is no matching which yields a greater weight than that of the optimal matching, for any permutation π we have:

$$\sum_{i=1}^{n} w'_{i\pi(i)} = \sum_{i=1}^{n} w_{i\pi(i)} + \sum_{i=1}^{n} \beta_{i\pi(i)} \quad (18)$$

$$\leq A^* + \sum_{i=1}^{n} \beta_{i\pi(i)}$$

$$\leq A^* + \sum_{i=1}^{n} \left(\max_{k} \delta_k\right)$$

$$= A^* + n \cdot \max_{k} \delta_k$$

$$A' \leq A^* + n \cdot \max_{k} \delta_k$$

The β-min-sum algorithm converges to the matching W'. Since each of the perturbation variables, $\beta_{ij}$ are chosen randomly from an interval of the form $(0, \delta_k)$, it follows that the perturbed edge weights, $w_{ij}'$ are all unique. Hence, as theoretically proven, the solution converges to the optimal matching for the perturbed graph.

The current solution of the assignment problem improves earlier solutions in the following manner:

(1) The cross-layer optimization problem is transformed from a nonlinear optimization problem in the assignment of rates and sub-carriers into a linear optimization problem.

(2) This solution uses a belief-propagation approach to determine the optimal (or near-optimal) rate and sub-carrier assignment. Since belief-propagation is widely used for iterative decoding, the proposed methods and devices extend the use of the belief-propagation algorithm to also solve the problem of cross-layer optimization. Thus, a common platform may be used in order to perform both operations.

(3) The solution provided by the Modified min-Sum Belief Propagation algorithm is optimal (or near-optimal) with a lower implementation complexity than the optimal Hungarian algorithm.

The system also includes permanent or removable storage, such as magnetic and optical discs, RAM, ROM, etc. on which the process and data structures of the present invention can be stored and distributed. The processes can also be distributed via, for example, downloading over a network such as the Internet. The system can output the results to a display device, printer, readily accessible memory or another computer on a network.

The many features and advantages of the invention are apparent from the detailed specification and, thus, it is intended by claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method of allocating wireless subcarrier bandwidth, comprising:
    defining a bipartite graph having first and second disjoint node sets;
    assigning users to the first set of nodes such that each node of the first set of nodes is assigned to only one user;
    assigning each sub-carrier to one and only one node of a second set of nodes;
    using edges, connecting each node of the first set of nodes to every node of the second set of nodes;
    weighting each edge using a value produced from a sub-carrier-dependent and rate-dependent utility function;
    numerically ordering unique edge weightings such that each unique edge weighting has at least one adjacent edge weighting and at least some of the unique edge weightings have a duplicate edge weighting that is not ordered;
    for duplicate edge weightings identifying a perturbation factor between adjacent unique edge weightings;
    perturbing all duplicate weightings by a random variable which is greater than zero and less than the perturbation factor; and
    using a message passing algorithm to allocate data rates and subcarriers to users.

2. The method according to claim 1, wherein the first set of nodes is assigned to unique user/data rate allocation combinations.

3. The method according to claim 2, wherein for every user, a node is assigned for each rate allocation of a plurality of potential rate allocations.

4. The method according to claim 1, wherein perturbation factors are assigned by a process comprising:
    for all of the duplicate weightings except the last duplicated weighting, identifying a perturbation factor that lies at the midpoint of the duplicate weighting and the next largest duplicate weighting; and
    for the last duplicate weighting, identifying a perturbation factor that is equal to the duplicate weighting.

5. The method according to claim 1, wherein at least one perturbation factor is determined as one half a distance between a unique edge weighting and the next largest unique edge weighting.

6. The method according to claim 1, wherein the first set of nodes is opposing and disjoint from the second set of nodes, and the message passing algorithm comprises:
    (a) passing messages from each node of the first set of nodes to every node of the second set of nodes, the messages respectively being the edge weightings;
    (b) passing messages from each node of the second set of nodes to every node of the first set of nodes, the messages respectively being the edge weightings;
    (c) for one of the first set of nodes, assuming that each node is assigned to the opposing node that sent the largest message;
    (d) determining if every node is assigned to one and only one opposing node; and (e) if any node is not assigned to one and only one opposing node:

(e1) modifying all edge weightings by:

$$W_{new} = W_{old} - W_{largest}$$

where $W_{new}$ is a modified edge weight, $W_{old}$ is a previous edge weighting and $W_{largest}$ is the largest edge weighting for all opposing nodes except for the node having the weighting being modified; and (e2) repeating steps (a) through (d).

7. The method according to claim 6, wherein $W_{old}$ is an original edge weighting before any edge weighting modification.

8. The method according to claim 1, wherein the message passing algorithm is a beta-min-sum belief algorithm.

9. The method according to claim 1, wherein the sub-carriers are subcarriers of an OFDMA wireless communication system.

10. The method according to claim 1, wherein if the number of nodes of the first set of nodes does not equal the number of nodes of the second set of nodes, the method further comprises adding dummy nodes to the first or second set of nodes to achieve equality in the number of nodes in both sets.

11. The method according to claim 10, wherein the first set of nodes is opposing the second set of nodes, and if the number of nodes of the first set of nodes does not equal the number of nodes of the second set of nodes, the method further comprises:

connecting each dummy node to every opposing node using dummy edges; and assigning a zero edge weighting to each dummy edge.

12. The method according to claim 1, wherein the argument of the utility function is a function of a long term average data rate for a user and a function of a modulation level currently being allocated to the user.

13. The method according to claim 1, wherein the bandwidth allocation utility function is represented by the following formula $$\max_{r[n]} \frac{\rho_w \Delta f}{M} \sum_{i=1}^{M} \sum_{k=1}^{K} \sum_{p=0}^{P-1} U_i'(\bar{r}_i[n-1]) D_p[n] \delta_{ikp}[n],$$

$$\text{subject to } \begin{cases} P[k,n] \leq P_{\max} & \forall k \\ r_i[n] \in F_\pi & \forall i \\ \lim_{n \to \infty} \bar{r}_i[n] \geq c_i & \forall i \end{cases}$$

where $\rho_w$ is a fixed factor, $\Delta f$ denotes a frequency spacing between adjacent sub-carriers, M is the number of users, $U'_i$ is the derivative of a utility function of user i which is a function of average past rates of the user $\bar{r}_i[n-1]$, $D_p[n]$ is a pth modulation level and $\delta_{ikp}[n]$ indicates an assignment of the $D_p[n]$ to user i over sub-carrier k during a current transmission frame n, P[k,n] is a transmission power used over the kth sub-carrier during an epoch, $P_{max}$ is a maximum power per subcarrier that cannot be exceeded, $r_i[n]$ denotes an instantaneous data rate assigned to the ith user over the current transmission interval, $F_\pi$ represents the set of feasible/potential data rates, $\bar{r}_i[n]$ is the long-term average data rate of the ith user and $c_i$ is a target data rate for the ith user.

* * * * *

UNITED STATES PATENT AND TRADEMARK OFFICE
CERTIFICATE OF CORRECTION

| | | |
|---|---|---|
| PATENT NO. | : 7,778,247 B2 | |
| APPLICATION NO. | : 11/976743 | |
| DATED | : August 17, 2010 | |
| INVENTOR(S) | : Marilynn Green | |

It is certified that error appears in the above-identified patent and that said Letters Patent is hereby corrected as shown below:

Column 15, Line 6, delete "weight," and insert --weighting,--, therefor.

Signed and Sealed this

Eighteenth Day of January, 2011

David J. Kappos
*Director of the United States Patent and Trademark Office*